US008085271B2

(12) United States Patent
Clegg et al.

(10) Patent No.: US 8,085,271 B2

(45) **Date of Patent: *Dec. 27, 2011**

(54) SYSTEM AND METHOD FOR DILATION FOR GLYPH RENDERING

(75) Inventors: Derek Clegg, Redwood City, CA (US); Haroon Sheikh, Campbell, CA (US)

(73) Assignee: Apple Inc., Cupertino, CA (US)

( * ) Notice: Subject to any disclaimer, the term of this patent is extended or adjusted under 35 U.S.C. 154(b) by 381 days.

This patent is subject to a terminal disclaimer.

(21) Appl. No.: 11/760,677

(22) Filed: Jun. 8, 2007

(65) Prior Publication Data

US 2008/0303825 A1 Dec. 11, 2008

(51) Int. Cl.
*G06T 11/00* (2006.01)

(52) U.S. Cl. ......................... 345/472; 345/660; 345/699

(58) Field of Classification Search .................. 345/467, 345/471, 472; 715/270

See application file for complete search history.

(56) References Cited

U.S. PATENT DOCUMENTS

| | | | | |
|---|---|---|---|---|
| 4,542,377 | A * | 9/1985 | Hagen et al. | 345/659 |
| 5,673,371 | A | 9/1997 | Koopman et al. | |
| 5,852,448 | A | 12/1998 | Cheng | |
| 5,870,107 | A * | 2/1999 | Fujisawa et al. | 345/467 |
| 5,890,184 | A * | 3/1999 | Ooishi | 715/203 |
| 6,069,554 | A | 5/2000 | Hoel | |
| 6,073,147 | A * | 6/2000 | Chan et al. | 715/234 |
| 6,173,194 | B1 * | 1/2001 | Vanttila | 455/566 |
| 6,266,070 | B1 * | 7/2001 | Shigi et al. | 345/467 |
| 6,501,475 | B1 | 12/2002 | Cheng | |
| 6,624,828 | B1 * | 9/2003 | Dresevic et al. | 715/771 |
| 6,867,787 | B1 * | 3/2005 | Shimizu et al. | 345/629 |
| 7,222,306 | B2 * | 5/2007 | Kaasila et al. | 715/801 |
| 7,535,471 | B1 * | 5/2009 | Mansfield | 345/467 |
| 2001/0048764 | A1 | 12/2001 | Betrisey et al. | |
| 2002/0186229 | A1 | 12/2002 | Brown Elliott | |
| 2003/0085870 | A1 | 5/2003 | Hinckley | |
| 2004/0177323 | A1 * | 9/2004 | Kaasila et al. | 715/513 |
| 2004/0212620 | A1 | 10/2004 | Dowling et al. | |
| 2004/0233620 | A1 | 11/2004 | Doczy et al. | |
| 2006/0123362 | A1 | 6/2006 | Keely | |
| 2006/0238517 | A1 | 10/2006 | King et al. | |
| 2007/0085759 | A1 | 4/2007 | Lee et al. | |

* cited by examiner

*Primary Examiner* — Michelle K Lay

(74) *Attorney, Agent, or Firm* — Blakely, Sokoloff, Taylor & Zafman LLP

(57) ABSTRACT

A system and method for dilating a glyph for glyph rendering is described. The method includes receiving information including at least one of an element value of a rendering matrix, a glyph characteristic, a display background characteristic, an application characteristic, a display characteristic, and a graphics engine characteristic. The method further includes determining a dilation factor value from the received information. The method also includes dilating the outline of the glyph using the determined dilation factor.

34 Claims, 7 Drawing Sheets

SYSTEM AND METHOD FOR DILATION FOR GLYPH RENDERING

BACKGROUND

1. Field of the Invention

This invention relates generally to the field of data processing systems. More particularly, the invention relates to a system and method for dilation for rendering of glyphs.

2. Description of the Related Art

Many different electronic displays exist today for a plurality of devices, including a variety of desktop and laptop computer displays, Personal Digital Assistants (PDAs), cellular telephones, MP3 players, and portable gaming systems. Various applications existed using the different displays wherein the displays may be used, for example, in different types of lighting (e.g., low to high light levels) at different angles of viewing (e.g., straight ahead, from above, or to the side), or different orientations of the display (e.g., vertical or horizontal). In addition, the technical features of the various displays widely vary (e.g., dots or pixels per inch {DPI}, number of horizontal, and/or number of vertical lines may be greater for a laptop display then for a cellular telephone display).

For glyphs on various displays, dilation may be performed to thicken an outline in the glyph's creation. The outline as initially created may be difficult to map pixels to so as to make a glyph legible. For example, the outline may be thin as to map to only one or a few pixel width when displaying. On high resolution displays, the few pixels may be unrecognizable and therefore the glyph be illegible, difficult to decipher, or unpleasant to a viewer. Dilation is constant, though, without regards to display and/or application type. Independent of the amount of skew, scaling, rotation, type of character, font, resolution, etc. that a glyph endures, dilation is always performed using a constant factor. Therefore, what might be clearly discernible on one display for a specific application may be difficult to read or recognize on a different display and/or application. For example, a display with less DPI may make the same glyph more difficult to read than on a display with more DPI.

Therefore, what is needed is a system and method for improving dilation and rendering of glyphs for various displays and/or applications.

SUMMARY

A system and method for dilating a glyph for glyph rendering is described. The method in one embodiment includes receiving information including at least one of an element value of a rendering matrix, a glyph characteristic, a display background characteristic, an application characteristic, a display characteristic, and a graphics engine characteristic. The method further includes determining a dilation factor value from the received information. The method also includes dilating the outline of the glyph using the determined dilation factor. In another embodiment, a system determines a dilation factor based on an input criteria which may differ from one system to another system. The dilation factor may be dynamically determined based on, for example, the effective resolution of a display device (which may be varied by binning pixels). The dilation factor may also be dynamically determined based on, for example, a characteristic of a background image, etc. The dilation factor may also be dynamically determined on, for example, the orientation of the display to render the glyph or the amount of ambient light in the room. Other systems and methods are described, and computer readable media storing executable program instructions to cause a data processing system to perform methods are also described.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

The following description describes a system and method of dilation for rendering glyphs on a display. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Glyph Rendering

Figure 1:
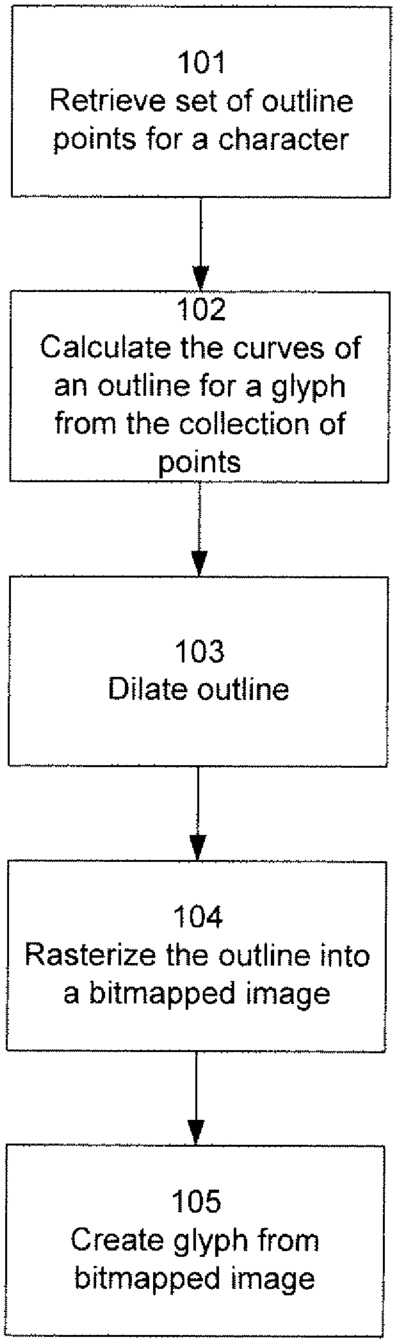
FIG. 1 illustrates a method of rendering a glyph on a display of an electronic device.
Figure 2:
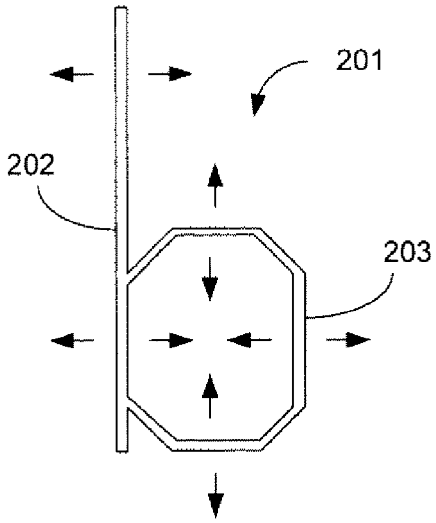
FIG. 2 illustrates an example outline for a lowercase "b".

FIG. 1 illustrates an exemplary method of rendering a glyph on a display of an electronic device. Before describing the method, some of the words in describing rendering will be defined. A character is the smallest element of a character set and may represent the concept of a letter, number, or symbol to the electronic device. An outline is a collection of lines and curves to depict a character before creation of a glyph. FIG. 2 depicts an example outline for a lowercase "b" 201. The straight lines of the outline are for illustration purposes only (e.g., lines 202 and 203). The outline may also include a collection of curves or other drawings. A glyph is the final representation of the character on the display.

Beginning at 101, a module of the electronic device retrieves a set of outline points for a character. In one embodiment, a character is identified by a single byte value (e.g., from $00 to $FF). In other embodiments, characters of a character set may be defined using multiple bytes (e.g., two bytes for the Japanese language) or another form of identifier. Upon recognizing a value identifying a specific character of a character set (e.g., lowercase "b"), the set of outline points may be retrieved for that character.

Proceeding to 102, another module calculates the curves of an outline from the collection of points. In one embodiment, two types of outline points exist: on-curve points and off-curve points. The on-curve points define the endpoints of a curve. The off-curve points are used in determining the curvature of the curve. If no off-curve point exists for two on-curve points defining a curve, then the curve is straight line between the two on-curve points. In one embodiment, the module uses a parametric Bezier equation with the on-curve and off-curve points as input in order to draw the collection of curves and thus the outline. In other embodiment, the curves may be defined by any type of equation or algorithm (e.g., Frenet-Serret formula).

FIG. 2 illustrates an example outline 201. Curves 202 and 203 represent curves for which no off-curve points exist for the two on-curve points. In one embodiment, the outline approximately represents a border of the glyph (the outline may be approximate because the actual border may be changed later, such as for example through rasterization or anti-aliasing). In other embodiments, the outline may be a single path or skeleton of the glyph or any form between a border and skeleton of the glyph.

Figure 3:
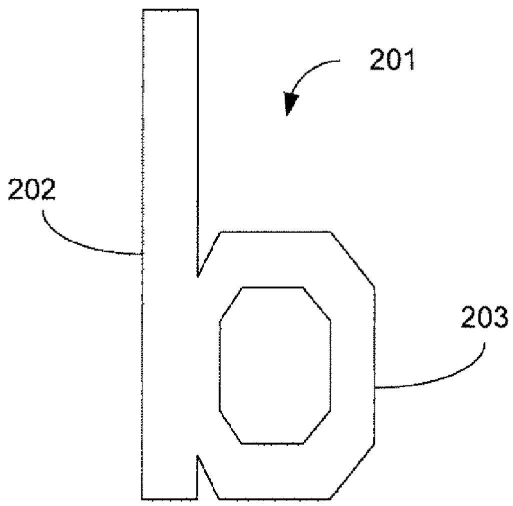
FIG. 3 illustrates the outline of the lowercase "b" of FIG. 2 after dilation.

Proceeding to 103 of FIG. 1, the outline is dilated. In dilation, the outline is expanded away from a boundary or skeleton. FIGS. 2 and 3 illustrate dilation. The arrows in FIG. 2 represent the direction the different curves of the lowercase "b" will be stretched and/or shifted. FIG. 3 illustrates the lowercase "b" 201 after dilation (movement/stretching of the curves). The topologically inside curves of the lowercase "b" 201 seem to contract and the topologically outside curves seem to expand, thus increasing the width in many areas of the glyph represented by the outline. In other embodiments of the present invention, dilation may be prevented in certain directions. For example, the glyph could be bounded by a base line and a maximum height value. Therefore, dilation in the vertical direction could be abridged once the outline reaches the bounding limits.

In one embodiment, dilation is performed using a dilation factor. A dilation factor may be, but is not limited to, a variable, set of variables, a function, or a set of functions. In one embodiment, the dilation factor may be two variables, one for dilation in the horizontal (x) direction and one for dilation in the vertical (y) direction. To dilate an outline, the two variables are applied to (e.g., multiplied to) the spatial coordinates of the points of the outline. In another embodiment, the dilation factor may be a unction with an input of the spatial coordinates of an outline (x1, y1) and output a new spatial coordinate for each point (x2, y2). For example, an on-curve point's (one of the outline points) spatial coordinates are inputted into the dilation factor (function), and new spatial coordinates are given for the on-curve point such that the on-curve point is now farther from or closer to the spatial center of the outline. The function would be used for each point of the outline, which may include points along each curve between two on-curve points. In another embodiment, different functions may exist for different types of points or different portions of the outline. For example, one curve may use a first dilation factor (function) while a second curve may use a second dilation factor (function). In a further example, a first quadrant of the outline may use a first dilation function while the fourth quadrant of the outline may use a second dilation function.

In another embodiment of the dilation factor, a variable or scalar is used to modify the spatial coordinates of points or curves of an outline. For example, a variable or set of variables is/are multiplied to a scalar matrix (described below) in order to adjust the size and dilate the outline. Dilation is described in further detail in the next section.

Figure 4:
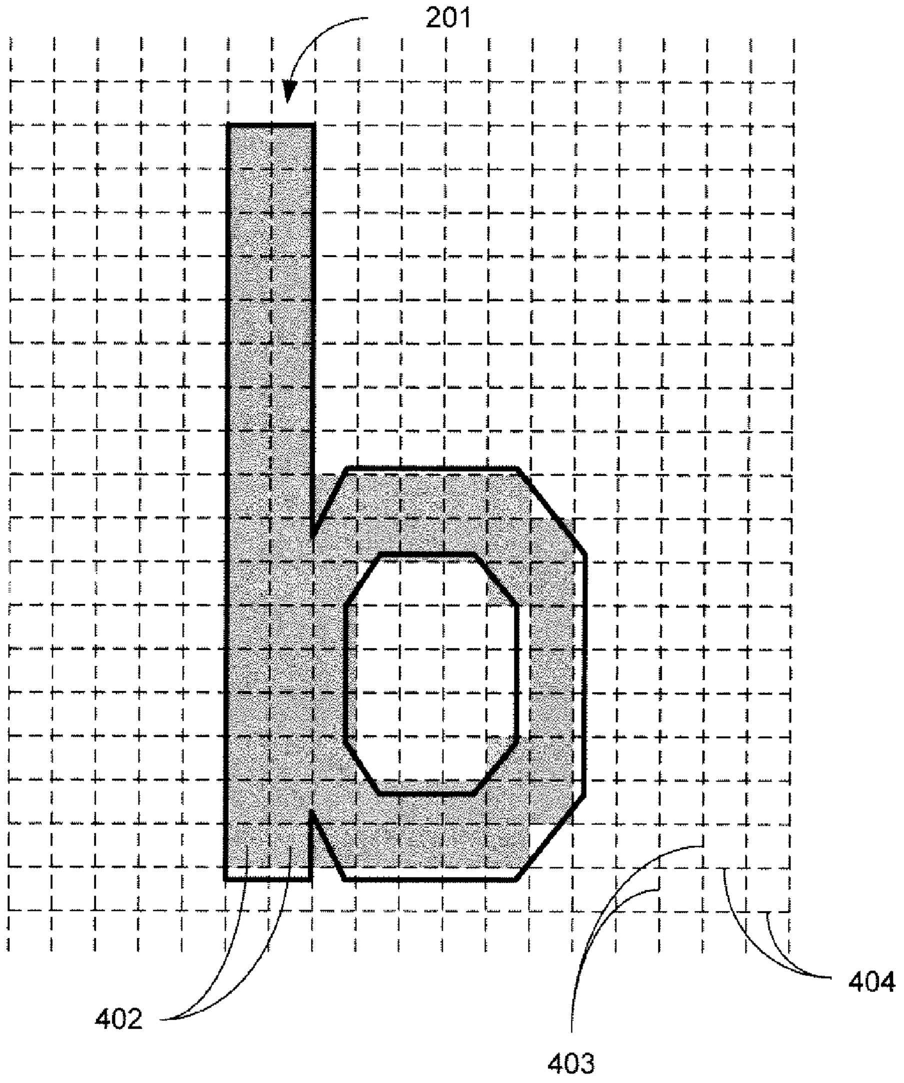
FIG. 4 illustrates the rasterization of the dilated outline of the lowercase "b" of FIG. 3.

Referring back to FIG. 1, after dilation of the outline, process flows to 104. In 104, the outline is rasterized into a bitmapped image. In rasterization, the dilated outline is converted mapped to pixels to be displayed. FIG. 4 illustrates the rasterization of lowercase "b" 201 from FIGS. 2 and 3. The squares 402 represent pixels filled in during rasterization. The pixels are bounded by vertical lines 403 and horizontal lines 404. In one embodiment, if over 50% of the area of the pixel is within the outline, then the pixel is filled in. Various embodiments exist in determining when to fill in a pixel, for example, using a different percentage or having predefined rules for glyphs in determining when to fill in partially covered pixels.

Upon rasterization, the final glyph is created from the bitmapped-image in 105 of FIG. 1. In one embodiment, in 104 the outline is rasterized into an anti-aliased bitmapped-image that is the final glyph. In other embodiments, anti-aliasing (in order to smooth jagged edges and make the glyph more appealing) or other functions are later performed on the bitmapped image to create the glyph. Once the glyph is created, it may be rendered on the display.

Dilation

Figure 5A:
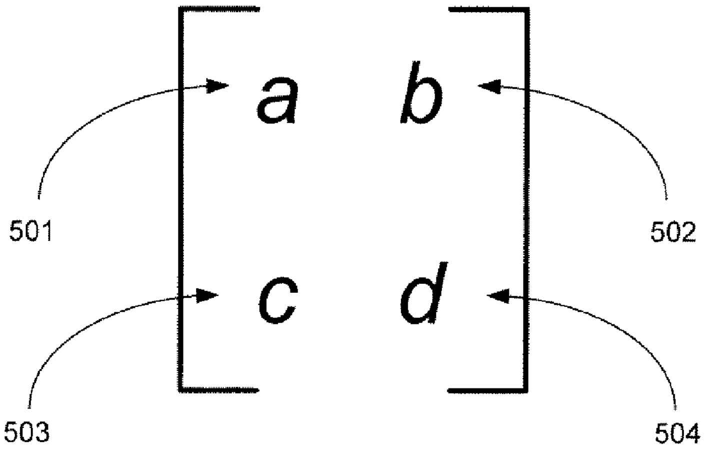
FIG. 5A illustrates the input to a glyph rendering system as a 2×2 matrix.
Figure 5B:
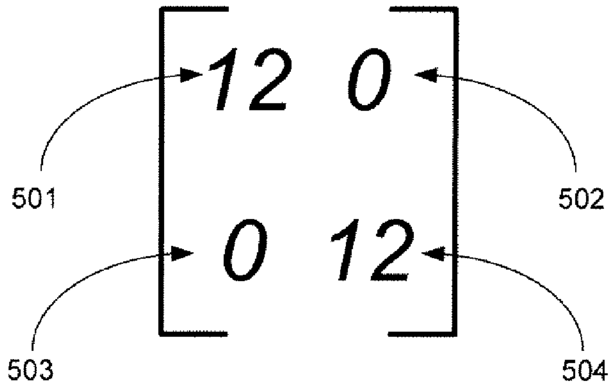
FIG. 5B illustrates a specific example of the 2×2 matrix of FIG. 5A for pure scale.
Figure 5C:
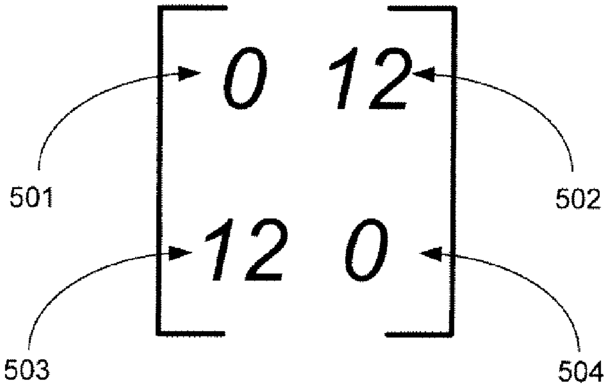
FIG. 5C illustrates a specific example of the 2×2 matrix of FIG. 5A for pure scale rotated.

In one embodiment, one set of outline points exist to create an outline. Therefore, the outline as defined by the outline points is one size. In order to shrink/contract or grow/expand an outline to an appropriate size (e.g., different font sizes), an input to a glyph rendering system indicates how much and in what direction(s) an outline should be grown or expanded, in addition to other features (skew, rotation, etc.). FIG. 5A illustrates the input to a glyph rendering system as a 2×2 "scaling" matrix (4 elements). In one embodiment, element "a" 501 is the horizontal ("x") scale factor. Element "d" 504 is the vertical ("y") scale factor. Thus, to pure scale an outline to a specific size, a=d constant (C). For example, FIG. 5B illustrates the matrix to pure scale a glyph to size 12 (a=d=12). Elements "b" and "c" (502 and 503) are the scale factors for rotated text. FIG. 5C illustrates the matrix to rotate a glyph from a horizontal position to a vertical position (plus or minus 90 degrees). 90 degree rotation occurs when b=c and a=d=0. The rotated glyph is further scaled to size 12 because b=c=12. In other embodiments, all elements 501-504 may be non-zero while the glyph is rotated. Thus, the matrix allows glyphs to be rendered in at least two orientations (horizontal and vertical). In addition to rotation and scaling, the matrix allows glyph obliquing (slanting). In one embodiment of obliquing, element b 502 equals 0. The obliquing angle is then determined by the inverse tangent of d 504 divided by c 503.

In one embodiment, the scaling matrix is applied to the outline by multiplying each point of the outline in source space by the scaling matrix. For example, the spatial coordinates of the points of an outline are multiplied by the matrix to create new coordinates (similar to one embodiment of dilation as described above).

Figure 6:
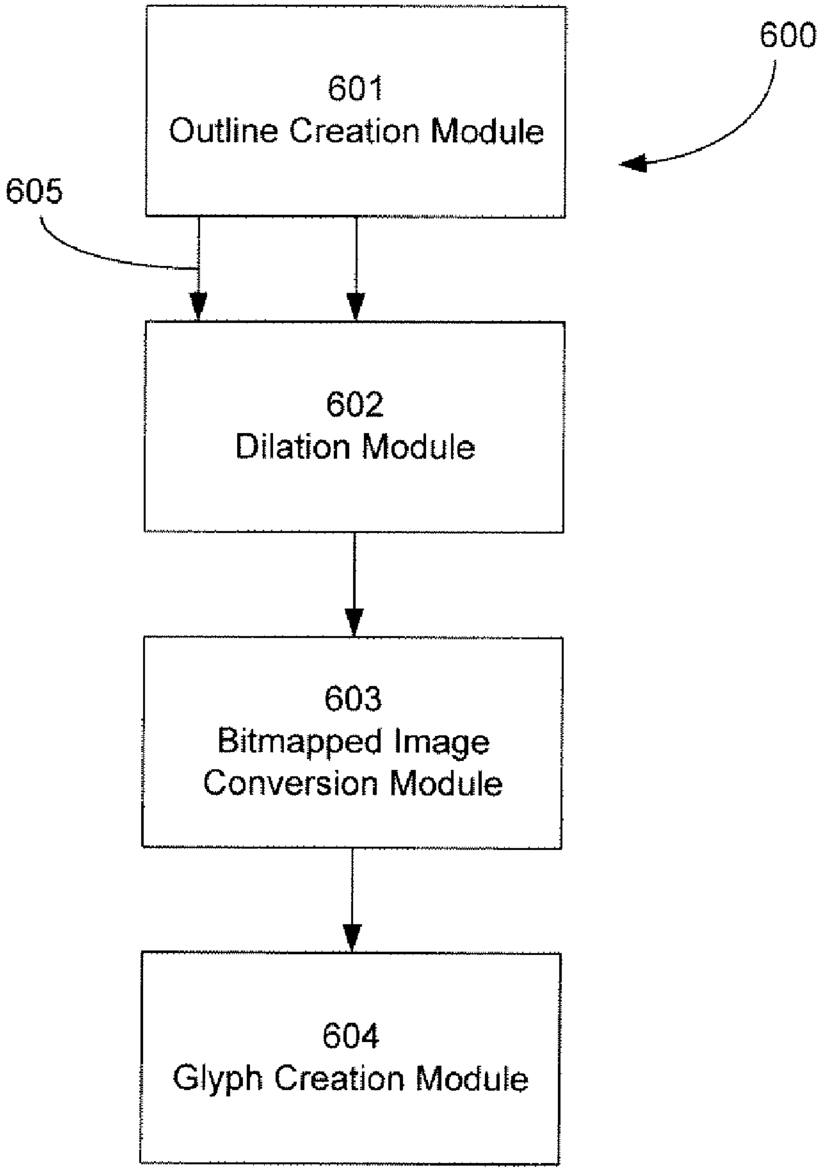
FIG. 6 illustrates a glyph rendering system for at least performing the method of FIG. 1.

FIG. 6 illustrates an example glyph rendering system 600. The glyph rendering system 600 generally comprises: an outline creation module 601, a dilation module 602, a bitmapped image conversion module 603, and a glyph creation module 604. The outline creation module 601 retrieves the set of outline points (101 of FIG. 1), calculate the curves of an outline (102), and performs any scaling, rotation, and/or skew using the scaling matrix (FIG. 5A) of predetermined elements a-d (501-504) by multiplying the matrix with the spatial coordinates of the points of the outline.

Figure 7:
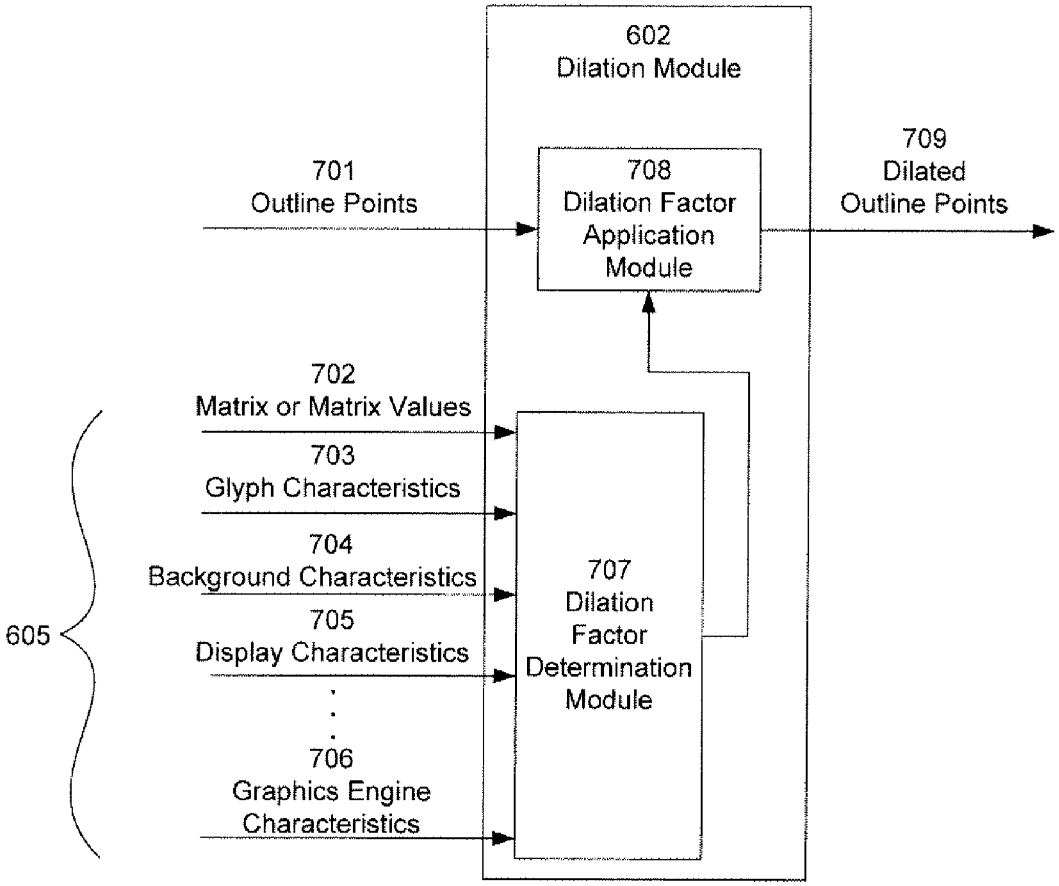
FIG. 7 illustrates an example dilation module of FIG. 6.

Upon creation of the outline, the dilation module 602 dilates the outline (103 of FIG. 1). FIG. 7 illustrates one embodiment of the dilation module 602. The dilation module 602 includes a dilation factor determination module 707 to receive information 605 and create the dilation factor. The information 605 may include, but is not limited to, the scaling matrix, information about the matrix, element values a-d (501-504), and/or information from the operations performed by the outline creation module 601 (702 of information 605) to create at least one dilation factor to dilate the outline.

The dilation factor may be determined heuristically. For example, for predetermined values or specific information 605, it may be previously determined that a specific dilation factor creates the most appealing glyph. For example, when the dilation factor equaling a value X when matrix elements a=d=12 and b=c=0 (as illustrated in FIG. 5B) has been previously determined as the best dilation factor value, the dilation factor is set to value X when those same matrix elements are received. In another example, the dilation factor is set to a specific function (e.g., f(x,y)) when elements or information fall within ranges of specified values or parameters.

As previously described, the dilation factor may be a pair of values equal to the number of coordinate planes of the glyph (e.g., 2 for 2 Dimensions). Therefore, the dilation factor determination module 707 may create/select two values. Alternatively, the dilation factor determination module 707 may select multiple functions using the input information 605 (e.g., two functions, one to alter horizontal coordinates and one to alter vertical coordinates). Alternative to heuristic methods, an algorithm to create the dilation value(s) may also be created/used with a variety of inputs 605 and weights. In another embodiment, different sets of functions are created to determine the dilation factor(s) depending on the received information.

Examples of information 605 that may affect the dilation factor include the magnitude of pure scale of the outline, pure scale in combination with rotation, obliquing or skew, the effective glyph height (length of the vector perpendicular to the baseline whose length is the maximum height of the glyph), and some root-determinant heuristic between pure scale and pure scale rotated (e.g., the square root of the absolute value of a*d {501 and 504}−b*c {502 and 503}).

Other groups of information 605 (FIG. 7) exist that may also be used in determining the dilation factor in the dilation factor determination module 707, which may include, but not limited to, glyph characteristics 703, background characteristics 704, application characteristics 705, display characteristics, and graphics engine characteristics 706. Example glyph characteristics 703 that may affect the dilation factor includes, but is not limited to, the type of font (e.g., different dilation factors between Japanese text and Roman text), the color of the glyph (e.g., different dilation factors between red and black), the texture of the glyph, the border width of the glyph, the contrast of the glyph to the background (e.g., difference of glyph color from background color), the existence of kerning and the severity of kerning. Example background characteristics 704 may include, but is not limited to, whether motion exists behind the glyph, the speed of the motion, and the amount of noise behind the glyph (e.g., a complex background has more noise or contrast changes than a monotone background). Example applications include, but are not limited to, the amount of ambient light (e.g., is the room light or dark?), the orientation of the display (e.g., upright, slanted down, slanted up, rotated, etc.), speed of appearance and disappearance of glyph, movement of glyph across screen, speed of movement, curvature of text or strings comprising glyphs (e.g., words written in an arc versus along a straight line, vertical orientation of word, etc.), and typical viewing angle of the display. Example display characteristics 705 and graphics engine characteristics 706 that may affect the dilation factor may include, but is not limited to, the resolution of the screen (e.g., DPI), pixel height in relation to pixel width, actual size of pixels of the display, luminance of the display, contrast and brightness settings, refresh rate, orientation of the display (e.g., horizontal and vertical), available graphical processing unit (GPU) resources, and movement of the display. To receive such information, the glyph rendering system may receive information from sensors attached to the display and/or device or information from other components of the electronic device. In one example, a device with a display (e.g., cell phone or mp3 player) includes an accelerometer to determine the orientation of the display and/or movements of the display. Accelerometer information is received by the glyph rendering system and therefore used to help determine the dilation factor(s). In another example, the device includes an ambient light sensor to determine the amount of light present in a room to help determine dilation factor(s).

The dilation factor determination module 707 determines the dilation factor (e.g., a pair of values x,y) and sends the dilation factor to the dilation factor application module 708 of the dilation module 602. In one embodiment, the dilation factor application module 708 receives the dilation factor and applies it to the received outline points 701. For example, the module 708 multiplies the horizontal coordinate of each outline point by the x value and multiplies the vertical coordinate of each outline point by the y value, thus creating new spatial coordinates for the outline points 701 (dilating the outline points 701 to create dilated outline points 709). The dilation factor application module 708 then outputs the dilated outline points 709 which create the dilated outline. Alternative to modifying spatial points of the outline, the curves of the outline may be modified.

After dilation of the outline by the dilation module, the bitmapped image conversion module 603 rasterizes the dilated outline (104). Finally, the glyph creation module 604 creates the final glyph from the bitmapped image (105).

Figure 8:
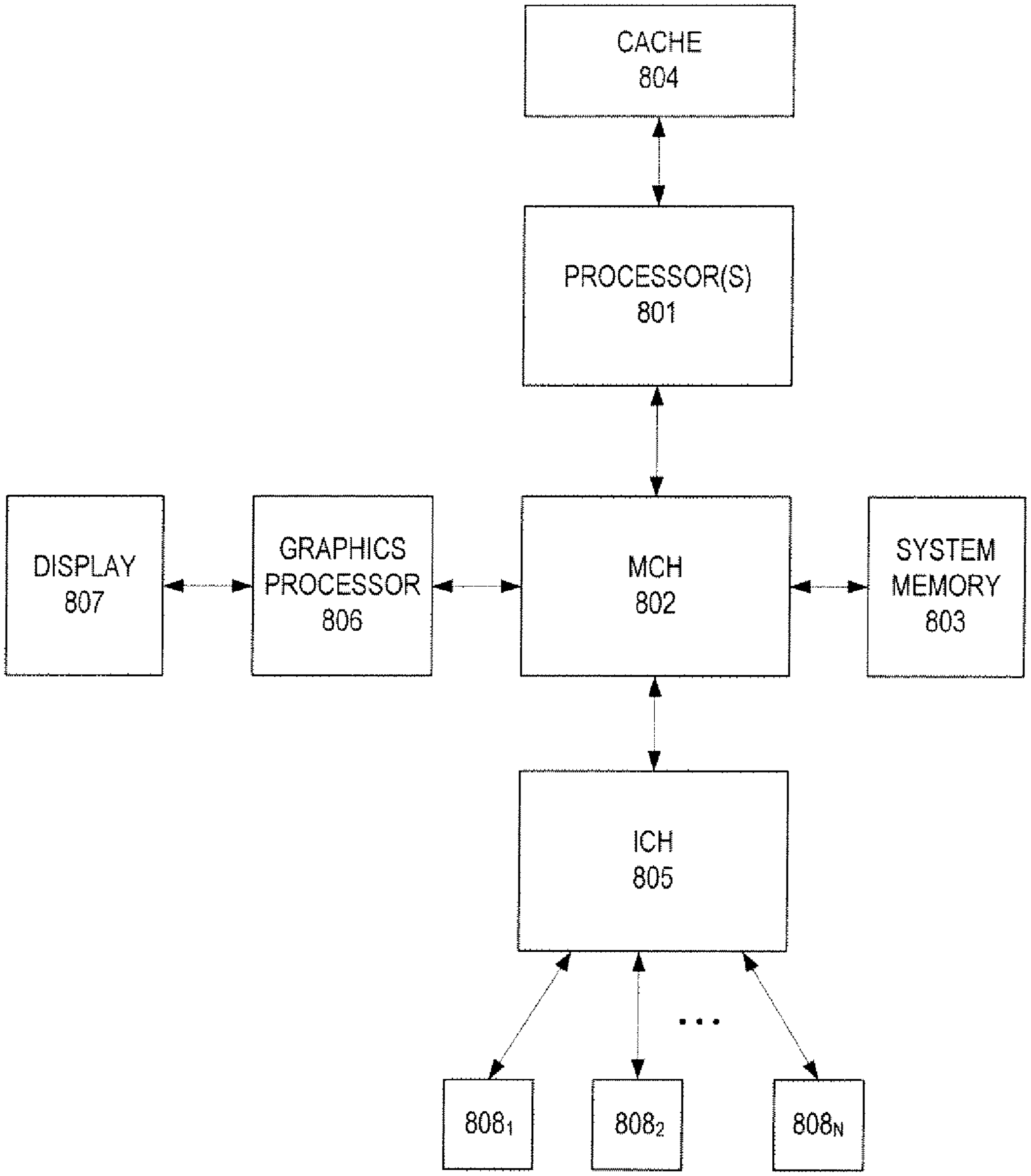
FIG. 8 illustrates an embodiment of a data processing system (such as a computer) to include the glyph rendering system of FIG. 6.

FIG. 8 illustrates an embodiment of a data processing system (e.g., a computer) that may include the glyph rendering system of FIG. 6. The exemplary data processing system of FIG. 8 includes: 1) one or more processors 801; 2) a memory control hub (MCH) 802; 3) a system memory 803 (of which different types exist such as DDR RAM, EDO RAM, etc,); 4) a cache 804; 5) an I/O control hub (ICH) 805; 6) a graphics processor 806; 7) a display/screen 807 (of which different types exist such as Cathode Ray Tube (CRT), Thin Film Transistor (TFT), Liquid Crystal Display (LCD), DPL, etc.; and/or 8) one or more I/O devices 808. It will be understood that the system shown in FIG. 8 is an example of one type of data processing system and that other examples may have a different architecture and/or may have more or fewer components. It will further be understood that the system may be a general purpose computer, a special purpose computer, a PDA, a cellular telephone, a handheld computer, and entertainment system (e.g., MP3 player), or a consumer electronic device.

The one or more processors 801 execute instructions in order to perform whatever software routines the computing system implements. The instructions frequently involve some sort of operation performed upon data. Both data and instructions may be stored in system memory 803 and cache 804. Cache 804 is typically designed to have shorter latency times than system memory 803. For example, cache 804 might be integrated onto the same silicon chip(s) as the processor(s)

and/or constructed with faster SRAM cells whilst system memory 803 might be constructed with slower DRAM cells. By tending to store more frequently used instructions and data in the cache 804 as opposed to the system memory 803, the overall performance efficiency of the computing system improves.

System memory 803 may be deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 803 prior to their being operated upon by the one or more processor(s) 801 in the implementation of a software program. Similarly, data that a software program determines should be sent from the computing system to an outside entity through one of the computing system interfaces, or stored into an internal storage element, is often temporarily queued in system memory 803 prior to its being transmitted or stored.

The ICH 805 is responsible for ensuring that such data is properly passed between the system memory 803 and its appropriate corresponding computing system interface (and internal storage device if the computing system is so designed). The MCH 802 is responsible for managing the various contending requests for system memory 803 access amongst the processor(s) 801, interfaces and internal storage elements that may proximately arise in time with respect to one another.

One or more I/O devices 808 are also implemented in a typical computing system. I/O devices generally are responsible for transferring data to and/or from the computing system (e.g., a networking adapter); or, for large scale non-volatile storage within the computing system (e.g., hard disk drive). ICH 805 has bi-directional point-to-point links between itself and the observed I/O devices 808.

Embodiments of the invention may include various operations as set forth above. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Elements of the present invention may also be provided as a machine-readable medium (e.g., a computer readable medium) for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions.

For example, the dilation factor(s) may be incorporated into the rendering matrix so that dilation is performed at the same time as scaling, skewing, etc. of the outline (e.g., the horizontal dilation and vertical dilation variables create a 2×1 dilation matrix which is multiplied to the scaling matrix).

The modules of the glyph rendering system 600 may include software, hardware, firmware, or any combination thereof. For example, the modules may be software programs available to the public or special or general purpose processors running proprietary or public software. The software may also be specialized programs written specifically for the rendering of glyphs.

Accordingly, the scope and spirit of the invention should be judged in terms of the claims which follow.

What is claimed is:

1. A method for dilating an outline of a glyph, comprising:
- receiving an information including at least one of:
  - an element value of a rendering matrix; and
  - a display characteristic including an orientation of a display for rendering the glyph;
- determining by an electronic device at least one dilation factor from the orientation, wherein the at least one dilation factor is determined by a dilation module that is separate from an outline creation module configured to scale the glyph by a scale factor; and
- dilating the outline of the glyph using the at least one dilation factor.

2. The method of claim 1, wherein the information further includes at least one of:
- a glyph characteristic;
- a display background characteristic;
- an application characteristic; and
- a graphics engine characteristic.

3. The method of claim 1, wherein the information is received by a sensor, the sensor being an accelerometer and/or an ambient light sensor.

4. The method of claim 1, wherein the at least one dilation factor comprises a first dilation factor and a second dilation factor.

5. The method of claim 4, wherein the first dilation factor is for dilation in the horizontal direction and the second dilation factor is for dilation in the vertical direction.

6. The method of claim 1, wherein the at least one dilation factor comprises only one dilation factor, the dilation factor for dilation in the horizontal direction and dilation in the vertical direction.

7. The method of claim 1, further comprising:
- creating a bitmapped image from the dilated outline;
- creating the glyph from the bitmapped image; and
- displaying the glyph on a display.

8. The method of claim 1, wherein the at least one dilation factor is an at least one function.

9. The method of claim 8, further comprising creating the at least one function from the information.

10. The method of claim 1, wherein the at least one dilation factor is configured to thicken the outline of the glyph.

11. A system for dilating an outline of a glyph, comprising:
- a receiving module comprising an electronic device to receive an information including at least one of:
  - an element value of a rendering matrix; and
  - a display characteristic including an orientation of a display for rendering the glyph:
- a determination module to determine at least one dilation factor from the orientation wherein the at least one dilation factor is determined by a dilation module that is separate from an outline creation module configured to scale the glyph by a scale factor; and
- a dilation module to dilate the outline of the glyph using the at least one dilation factor.

12. The system of claim 11, wherein the information is received by a sensor, the sensor being an accelerometer and/or an ambient light sensor.

13. The system of claim 11, wherein the at least one dilation factor comprises a first dilation factor and a second dilation factor.

14. The system of claim 13, wherein the first dilation factor is for dilation in the horizontal direction and the second dilation factor is for dilation in the vertical direction.

15. The system of claim 11, wherein the at least one dilation factor comprises only one dilation factor, the dilation factor for dilation in the horizontal direction and dilation in the vertical direction.

16. The system of claim 11, further comprising:

a creation module to create a bitmapped image from the dilated outline;

a conversion module to create the glyph from the bitmapped image; and a display module to display the glyph on a display.

17. The system of claim 11, wherein the at least one dilation factor is an at least one function.

18. The system of claim 17, further comprising a function creation module to create the at least one function from the information.

19. The system of claim 11, wherein the information further includes at least one of:

a glyph characteristic;

a display background characteristic;

an application characteristic; and a graphics engine characteristic.

20. The system of claim 11, wherein the at least one dilation factor is configured to thicken the outline of the glyph.

21. A machine-readable non-transitory storage medium storing executable instructions to cause a processor to perform a method for dilating a glyph, comprising:

receiving an information, from an electronic device, including at least one of:

an element value of a rendering matrix; and a display characteristic including an orientation of a display for rendering the glyph determining at least one dilation factor from the orientation, wherein the at least one dilation factor is determined by a dilation module that is separate from an outline creation module configured to scale the glyph by a scale factor; and dilating the outline of the glyph using the at least one dilation factor.

22. The machine-readable medium of claim 21, wherein the at least one dilation factor comprises a first dilation factor and a second dilation factor.

23. The machine-readable medium of claim 22, wherein the first dilation factor is for dilation in the horizontal direction and the second dilation factor is for dilation in the vertical direction.

24. The machine-readable medium of claim 21, wherein the at least one dilation factor comprises only one dilation factor, the dilation factor for dilation in the horizontal direction and dilation in the vertical direction.

25. The machine-readable medium of claim 21, further comprising:

creating a bitmapped image from the dilated outline;

creating the glyph from the bitmapped image; and displaying the glyph on a display.

26. The machine-readable medium of claim 21, wherein the at least one dilation factor is an at least one function.

27. The machine-readable medium of claim 26, further comprising creating the at least one function from the information.

28. The machine-readable medium of claim 21, wherein the information is received by a sensor, the sensor being an accelerometer and/or an ambient light sensor.

29. The machine-readable storage medium of claim 21, wherein the information further includes at least one of:

a glyph characteristic;

a display background characteristic;

an application characteristic; and a graphics engine characteristic.

30. The machine-readable storage medium of claim 21, wherein the at least one dilation factor is configured to thicken the outline of the glyph.

31. A system for displaying a glyph on a display of an electronic device, comprising:

means for creating, by a hardware device, an outline of the glyph from a character information, wherein the glyph represents the character;

means for receiving an information including at least one of:

an element value of a rendering matrix; and a display characteristic including an orientation of a display for rendering the glyph;

means for determining at least one dilation factor from the orientation, wherein the at least one dilation factor is determined by a dilation module that is separate from an outline creation module configured to scale the glyph by a scale factor;

means for dilating the outline of the glyph using the at least one dilation factor;

means for creating a bitmapped image from the dilated outline;

means for creating the glyph from the bitmapped image; and means for displaying the glyph on the display.

32. The system of claim 31, wherein the information is received by a sensor, the sensor being an accelerometer and/or an ambient light sensor.

33. The system of claim 31, wherein the at least one dilation factor is configured to thicken the outline of the glyph.

34. The system of claim 31, wherein the information further includes at least one of:

a glyph characteristic;

a display background characteristic;

an application characteristic; and a graphics engine characteristic.

* * * * *